(No Model.)

J. A. LOMBAS.
COMBINED NUT AND BOLT LOCK AND WASHER.

No. 597,293. Patented Jan. 11, 1898.

Witnesses:

Inventor
Joseph A. Lombas,
By Alexander Davis,
Attorneys.

UNITED STATES PATENT OFFICE.

JOSEPH A. LOMBAS, OF LOCKPORT, LOUISIANA, ASSIGNOR OF ONE-HALF TO PHLÉGIE R. MELANÇON, OF SAME PLACE.

COMBINED NUT AND BOLT LOCK AND WASHER.

SPECIFICATION forming part of Letters Patent No. 597,293, dated January 11, 1898.

Application filed August 9, 1897. Serial No. 647,644. (No model.)

*To all whom it may concern:*

Be it known that I, JOSEPH A. LOMBAS, a citizen of the United States, residing at Lockport, in the parish of Lafourche and State of Louisiana, have invented certain new and useful Improvements in a Combined Nut and Bolt Lock and Washer, of which the following is a specification, reference being had therein to the accompanying drawings, in which—

Figure 1:
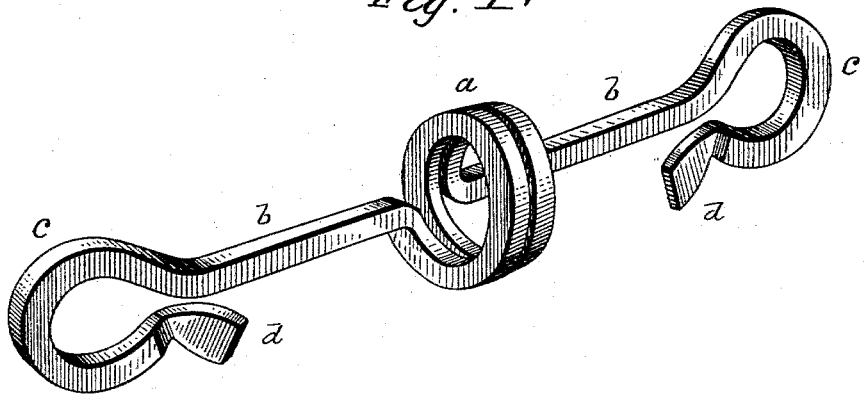
Figure 2:
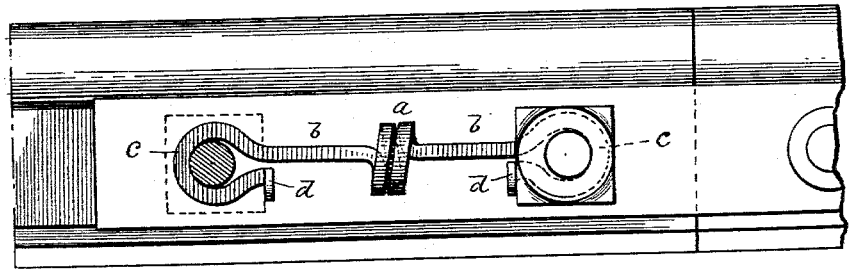

Figure 1 is a perspective view of my device detached; Fig. 2, a side elevation of a portion of a rail-joint provided with my device, and Fig. 3 a detail plan view of the device.

The object of my invention is to provide a simple device having the combined functions of holding a pair of adjacent bolts against endwise or rotative movement and locking the nuts on said bolts against turning and affording washers for the nuts, the device being exceedingly simple and durable and effective, as more fully hereinafter set forth.

Referring to the drawings by letters, $a$ designates a pair of spring-coils formed about midway the length of a steel bar or rod, the main portions $b$ of the rod extending outward in opposite directions from said coils, the parts $b$ being approximately in line with each other and lying at approximately right angles to the coils. The end of each portion $b$ is bent back upon itself to form an eye $c$, substantially circular in shape, and the extreme end of the part is flattened to form an ear $d$, which is bendable at its connection with the end of the bar. The ears $d$ are bent slightly outward, as shown.

The manner of applying the device is shown in Fig. 2. Before the nuts are screwed on the bolts the device is sprung over their projecting threaded ends and placed against the fish-plate, the bolts passing through the respective rings $c$ and the coils $a$ projecting outward from the fish-plate at a point about midway between the bolts. The contractile action of the coils draws the eyes $c$ strongly against the bolts and holds them against movement. Then the nuts are screwed home against the rings $c$, these rings being made thereby to serve as washers, and when the nuts are tightened they are locked against unscrewing by bending up the ears $d$ against their inner or adjacent sides, as shown.

I show in the drawings the device formed of a rod approximately square in cross-section; but it is obvious that without departing from the spirit of my invention in the least I may use a twisted rod or one being round or flat or other shape in cross-section. It will also be observed that I may use a greater or less number of coils than shown, and, further, that instead of contracting coils that tend to draw the two bolts together I may use expansive coils, so that the washers will press against the bolts.

It will be observed that my device is simple and inexpensive in construction and that when in place upon the rail-joint it serves to positively tie the bolts together and the nuts upon their respective bolts, preventing displacement or loosening, while at the same time being readily removable when it is desired to disconnect the rail-joint. An advantage arising from the employment of the bolt-engaging eyes is that the eyes not only serve as washers and thereby do away with independent washers, but that they also serve to hold the bolts against displacement should the locking-ears $d$ break off and the nut become unscrewed.

Figure 3:

It will be understood that the bar from which the device is formed need only be tempered throughout that portion forming the coils, thereby leaving the end portions free to be bent up against the sides of the nuts. If it is desired, however, to convert the washers $c$ into spring-washers by twisting or bending the same slightly to bring parts of the eyes out of alinement with other parts thereof, as shown in Fig. 3, said eye portions may also be tempered to give the necessary elasticity.

I am aware of Patent No. 517,534, granted April 3, 1894, to S. W. Wright, covering a rigid rod having an eye formed at each end to serve as a washer and a lug or ear adapted to be bent up against the nut, and I do not claim anything therein shown. I am also aware of my former patent, No. 581,215, granted April 20, 1897, covering a nut-lock simply, with no provision for locking the bolts or forming washers. My present invention differs from said patented structures in that it combines in one device a bolt-holder and nut-holder and washer, which, so far as I am aware, is an entirely new thing in this art.

In applying my improved device to a pair of bolts the washers are sprung over the ends of the bolts and pressed against the fish-plate, the intermediate spring serving to draw the eyes or washers strongly against the bolts and preventing endwise and rotative movements of the same, this bolt-holding feature being particularly advantageous in case the nut-locking ears become broken off.

Having thus fully described my invention, what I claim, and desire to secure by Letters Patent, is—

A combined nut-lock, washer and bolt-holder, comprising a single metallic bar having formed in it about midway its length a spring-coil, its two end portions being carried out in opposite directions away from the coil, each being formed into a bolt-grasping eye at its end and provided with a bendable nut-locking ear, whereby said eyes will form washers and be pressed strongly against the bolts between the nuts and the fish-plate to lock the bolts against movement and the nuts locked thereon, as and for the purposes set forth.

In testimony whereof I affix my signature in presence of two witnesses.

JOSEPH A. LOMBAS.

Witnesses:
C. G. DAVIS,
N. J. BARRIOS.